(12) United States Patent
Adams et al.

(10) Patent No.: US 6,757,156 B2
(45) Date of Patent: Jun. 29, 2004

(54) ERGONOMIC HAND HELD DISPLAY

(75) Inventors: Michael D. Adams, Saratoga, CA (US); Martin D. Heyman, Orinda, CA (US); Garth Gibby, Walnut Creek, CA (US); Matthew A. Rhoades, Daly City, CA (US); Mark H. Olson, San Francisco, CA (US)

(73) Assignee: Xybernaut Corporation, Fairfax, VA (US)

( * ) Notice: Subject to any disclaimer, the term of this patent is extended or adjusted under 35 U.S.C. 154(b) by 98 days.

(21) Appl. No.: 10/092,133

(22) Filed: Mar. 6, 2002

(65) Prior Publication Data

US 2003/0169563 A1 Sep. 11, 2003

(51) Int. Cl.[7] .................................................. G06F 1/16
(52) U.S. Cl. ..................... 361/681; 361/683; 349/58; 345/905; 235/472.01; D14/344; D14/389
(58) Field of Search ............................ 361/681, 683, 361/686; 348/58; 345/173, 905, 169; 235/375, 462, 462.01, 472.01; D14/371, 341, 342, 343, 374, 331, 346, 126–129

(56) References Cited

U.S. PATENT DOCUMENTS

| | | | |
|---|---|---|---|
| 4,611,406 A | | 9/1986 | Engstrom et al. .............. 33/443 |
| 5,305,244 A | | 4/1994 | Newman et al. ............ 364/708 |
| 5,404,267 A | * | 4/1995 | Silva et al. .................. 361/683 |
| 5,432,720 A | | 7/1995 | Lucente et al. ............. 364/708 |
| 5,568,357 A | * | 10/1996 | Kochis et al. ............... 361/681 |
| 5,801,941 A | * | 9/1998 | Bertram ....................... 700/83 |
| 5,844,824 A | | 12/1998 | Newman et al. ............ 345/156 |
| 6,052,279 A | * | 4/2000 | Friend et al. ................ 361/686 |
| 6,297,795 B1 | | 10/2001 | Kato et al. .................. 345/123 |
| 6,304,431 B1 | | 10/2001 | Kim ............................ 361/680 |
| D451,097 S | * | 11/2001 | Schmeisser et al. ........ D14/371 |

FOREIGN PATENT DOCUMENTS

EP 1022644 A1 * 7/2000 ............. G06F/1/16

OTHER PUBLICATIONS

Panasonic Toughbook 07 with Mobile Data Wireless Display "www.panasonic.com/computer/notebook/html/01a07.htm".
Fujitsu Pen Tablet Computers (Stylistic[R]) "www.fpc.fujitsu.com/www/products_pentablets.shtml?products/pentablets/stylistic_3500".

* cited by examiner

Primary Examiner—Lisa Lea-Edmonds
(74) Attorney, Agent, or Firm—James J. Ralabate, Esq; Christ Tucker, Patent Agent (57) ABSTRACT

The invention relates to the field of wearable and portable computers. Specifically, the invention is a flat panel display device which is designed with certain ergonomic features which allow the user to operate the display device comfortably for longer periods of time than with previous prior art hand held displays.

39 Claims, 6 Drawing Sheets

ERGONOMIC HAND HELD DISPLAY

INVENTION

The invention is directed to a method of design of hand held or otherwise hand supported computer displays and integrated tablet style computers, wherein the housing of the display itself is designed to maximize the ergonomic nature of the device and to distribute mass closest to hand holding the device in such a way as to minimize inertial affects from moving the display and carrying it over extended periods of time.

BACKGROUND OF THE INVENTION

Wearable or user-supported personal computers are known in the art and are becoming increasingly pervasive. Examples of user-supported personal computers include U.S. Pat. No. 5,305,244 (Newman I) which discloses a voice-activated, user-supported computer (mobile computer) and U.S. Pat. No. 5,844,824 (Newman II) which discloses a body-worn, hands-free computer system that does not rely upon keyboard input or activation apparatus, both commonly assigned to Xybernaut Corporation of Fairfax, Va. The disclosures of these two commonly owned U.S. Pat. Nos. 5,305,244 and 5,844,824 are hereby incorporated by reference into this disclosure. For the purposes of this disclosure and claims the term "wearable computer" will be taken to mean a computer such as is disclosed in these two patents or a suitable analogous user supported computer disclosed elsewhere. These computers are typically contained within a single housing which usually connects to an external display. All other essential non-redundant computer components are contained within the single enclosure. A connector port is usually disposed on at least one face of the enclosure with various connectors for external input and output devices. The computer casing is also designed with attachment means such as belt loop bracket or clip so that the casing may be easily attached to the body of a user or otherwise supported by a user.

Also disclosing wearable computers are U.S. Pat. Nos. 5,285,398 (Janik I), U.S. Pat. No. 5,491,651 (Janik II), U.S. Pat. No. 5,581,492 (Janik III), U.S. Pat. No. 5,798,907 (Janik IV), U.S. Pat. No. 5,555,490 (Carroll I) and U.S. Pat. No. 5,572,401 (Carroll II). Each Janik patent discloses a belt computer containing the elements or components of a computer. For example, in Janik I, the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In each Janik patent, the flexible wearable computer is in the form of a relatively heavy belt comprising around its periphery sequentially positioned computer elements.

Both Carroll I and Carroll II disclose a wearable support and interconnection structure for a modular microcomputer system having a plurality of microcomputer cards housed in a plurality of microcomputer card pockets in a wearable garment. Examples of such garments include a pliable garment worn over the torso of the user (vest), a cap that fits snugly on user's head or in the form of a belt. In one embodiment, the pockets are linked by a plurality of channels extending from pocket to pocket that secure an electronic linking system to the wearable garment. The linking system includes a plurality of flat flexible cables encasing flexible circuitry and microcomputer card connectors. A card connector opens into each pocket to receive a microcomputer card. Each connector is operable, coupled to the cables such that when microcomputer cards are placed in the connectors and provided with power, an operational microcomputer system is created.

Also known in the prior art are pen tablet style computers, which are keyboardless flat panel screens with integral computer hardware and power supply. Such computers are for use by mobile workers and typically are activated by a pen stylus, voice, external mouse, or other activation device. Lucente et al., U.S. Pat. No. 5,432,720 (herein after Lucente) teaches such a pen based computer. The system of Lucente includes a housing and inetgral flat panel display. It further includes a switch which enables left handed and right handed use as well as portrait and landscape viewing perspectives. The switch allows the use to re-orient the output on the display screen such that it is always vertically oriented to the vertical midline plane of the user's body.

Lucente does not however, teach any design features that make the pen-based computer particularly ergonomic or comfortable for the user, but rather is directed at making the device more convenient. The distinction between comfort and convenience is that the former gets at the actual experience of the user when using the device while the latter addresses the flexibility or plurality of modes of use of the device.

Still further known in the prior art are tablet style computers that are designed for both desktop and hand-held use. Engstrom et al, U.S. Pat. No. 4,611,406 (hereinafter Engstrom) teaches such a multi-purpose tablet style device. The device of Engstrom, a graphics tablet input device, has a switching function for right and left-hand use by an operator. It also contains features such as a stylus that is removably storable within the case, elevation adjustment means by which an operator may adjust the angular attitude of the case with respect to a work surface. Another feature of Engstrom is the provision of gripping means on the underside of the case to facilitate hand-held operation of the graphic input tablet by an operator. Therefore Engstrom may alternative used as a hand-held device or as a desktop device with means for adjusting the viewing angle. However, except for the provision of handgrips, Engstrom fails to teach any features that truly make the device more comfortable for the user to use.

Another ergonomic display type known in the prior art is that of Kato et al, U.S. Pat. No. 6,297,795 (hereinafter Kato). Kato teaches a hand held information processing apparatus having an integral display screen and adapted to be held in the hand of a user and for displaying data in a portrait or landscape mode. The hand held device has a rotary switch disposed on one corner, at a position natural to be accessed by a person's thumb while holding the device. Rotation of the rotary switch permits the change of perspective from portrait to landscape and from left-handed to right-handed use. However, the design of the apparatus of Kato is a miniature screen such that the entire device fits in a single hand such as the PALM PILOT device manufactured and sold by Palm Corporation of Santa Clara, Calif. Kato does not teach ergonomic design of a hand held display device wherein the device is much larger than a user's hand therefore requiring various ergonomic features to enhance usability and comfort. While these palm type computers have enjoyed immense popularity, their relative small displays, low display resolution and limited processing capability have prevented their use by those who need access to rigorous computing applications.

Kim, U.S. Pat. No. 6,304,431 teaches a detachable display for a portable computer. The portable computer system of Kim includes a hinge system and video cable that allows the display to be offset from the computer while the computer is resting on a surface. When the user is finished the hinges are retracted and the computer is closed like a clamshell. Kim, however, does not teach a computer system that is designed to be used and held at the same time.

Therefore, there is a need for an ergonomic hand held flat panel display that incorporates certain ergonomic features into its design.

SUMMARY OF THE INVENTION

It is therefore an object of the present invention to provide a novel hand held computer display devoid of the above noted disadvantages of the prior art.

It is another object of the present invention to create a novel hand held computer display device.

It is also an object of the present invention to create a hand held display device that is designed to minimize the burden on the user's wrist while using the display device.

It is a further object of the present invention to create a hand held display device which has angled hand grips designed to increase the comfort to the user.

It is still a further object of the present invention to create a hand held display with a gripping material that is positioned at a point on a hand grip that coincides with the mid point of the average person's hand.

It is yet another object of the present invention to create a hand held display device which has internal weight distributed in such a manner as to minimize inertial effects moving laterally away from the gripping hand to the opposing end of the display.

It is an additional object of the present invention to create a hand held display device that is capable of right handed and left handed use.

These and additional objects of the present invention are accomplished generally by a hand held display device which is designed to minimize the user's burden while using the display device.

In one embodiment of the present invention, the display device is a flat panel, touch-screen type display device used in conjunction with a wearable computer. Wearable Computers are typically supported by a belt or strap around the user's torso, or can alternatively be supported by a garment worn by the user. An example of a wearable computer is that disclosed in U.S. Pat. No. 5,844,824, or a like wearable computer. In this embodiment, the display device will be responsive to at least touch screen input or stylus input. The user will simply hold the display device in one hand while using his finger or the stylus in the other to navigate through software. When not in use, the display device can be stored in a pocket or attached to the same belt which is supporting the wearable computer. The display functions like any other flat panel computer display device, such as that common on laptop style computers with the added feature of a touch screen overlay.

In another embodiment of the present invention, the hand held display device can be used as a display device for a wearable computer while attached to said computer, but can alternatively be used as a thin client device in a stand-alone mode, wherein said mode is characterized by a lack of physical connection to an underlying computer. By "thin client" is meant a limited capability computer such as are sold in the market under the name personal digital assistant. These computers are usually characterized by a limited capability microprocessor such as a DRAGONBALL processor manufactured by Motorola Corporation. They are able to perform simple tasks such as data input and retrieval but are unable to perform robust computationally intensive applications as are general purpose computers. In this embodiment a user would have the choice of carrying the display device only, if his needs permitted, or carrying the display attached to a Wearable Computer.

In yet another embodiment of the present invention, the hand held display device is a completely integrated computer system. It is a combined flat panel display and computer, such as a laptop style computer, absent a physical interface such as a keyboard. In this mode, all the computing functionality is located in the hand held display allowing the user to carry a single device, rather than a system. A rechargeable power supply is integrated into the hand held display device or can be a separate battery in electrical connection thereto.

In all these embodiments, the distinguishing feature of the flat panel display device of the present invention over those of the prior art is that the display device itself is designed to maximize the user's comfort while using it. This is accomplished by various ergonomic features. One of the primary novel features is the design of the hand grip itself. The grips are designated primary and secondary grips, with the primary grip being the larger of the two. Therefore when a person is using the display device with stylus activation, they will hold it one hand by the primary hand grip and utilize the touch screen with a stylus in the other hand. Either right handed or left handed use may be accommodated by a hardware or software switch which rotates the display content by 180 degrees such that the user is always holding the device by at least the primary hand grip. Alternatively, if the user is reading data off the screen or has relatively long periods between when they need to touch the screen they can hold the display device with both hands, utilizing the primary and secondary hand grips simultaneously. The grips are constructed out of rubber or some other suitable impact absorbing, electrically shielding, friction enhancing material. In one feature, the hand grips are angled to approximate the natural angle of a person's hand relative to their wrist while using the device. Either side hand grip wraps around the display and is angled inward relative to the plane defined by the display screen itself at an angle less than 45 degrees from said plane towards the back of the display. The rubber hand grips are optimized for a power grip which is defined as a grip characterized by the thumb being placed on the front portion of the grip and remaining 4 fingers on the rear portion. The grip edges are rounded off so that the portion of the grip which rests in the crotch between the thumb and index finger is comfortable to the users. This inward tapering of the grips enables a person to control the movement of the screen more firmly than if the display screen were perfectly flat with squared edges. Secondly, tactile ridges are disposed on the grip, perpendicular to the curved surface created by the hand and running from the tip of the thumb to the tip of the remaining fingers and at locations approximating the position of the pads of a user's fingers. Both the thickness of the grip and position of the tactile ridges are dictated by approximation of the average human hand. This may be as specific as versions for the average male hand and the average female hand, or the grips may simply come in large, medium and small sizes. Another ergonomic feature of the present invention is that the weight inside the display device housing is distributed as close to the primary hand grip as possible to minimize the inertial effects from touching the display screen with a finger or stylus while holding it and using it. In the embodiment where the display device is a display for an externally connected computer, internal electrical components will be located closer to the primary handgrip than the secondary handgrip whenever possible. In the embodiment where the display device is a fully functional computer, needing no external connection, the primary handgrip itself will contain a detachable integral battery. This will place a significant weight source as close as possible to the user's hand maximizing control and comfort. In the absence of this, the wrist and hand would have to constantly fight against the force of the display moving from contact by a finger or stylus.

DETAILED DESCRIPTION OF THE DRAWING AND PREFERRED EMBODIMENTS

Figure 1:
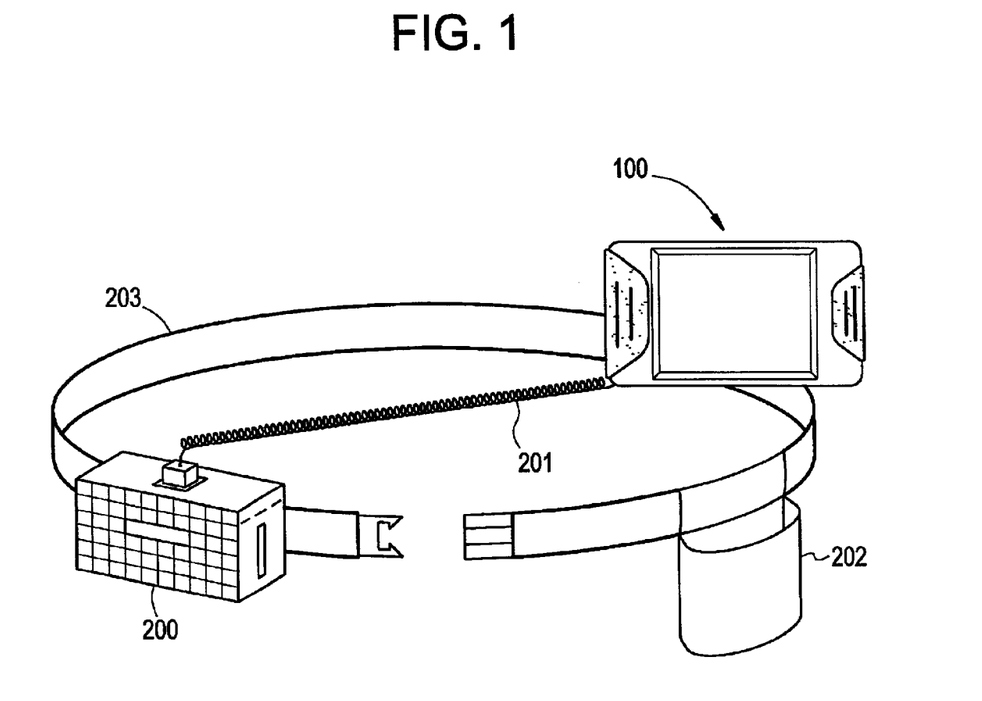
FIG. 1 is a to perspective front view of the hand held display of the present invention connected to a Wearable Computer.

Discussion of the present invention will now be made with specific reference to the drawing figures. FIG. 1 illustrates the display device 100 of the present invention attached to a Wearable Computer 200 system. The system is comprised of the hand held display 100, the computer 200, a video output cable 201, and a mounting belt 203. When the display 100 is used in such a system, it is optimally stored in a pouch 202 so that the user doesn't have to hold the display 100 when not using it. In this embodiment, the belt 203 is worn around the waist or torso of the user. Optionally, the system 200 may be attached or embedded into a garment, sash, holster, or other mechanism for attaching the system 200 to the body of a user.

Figure 2A:
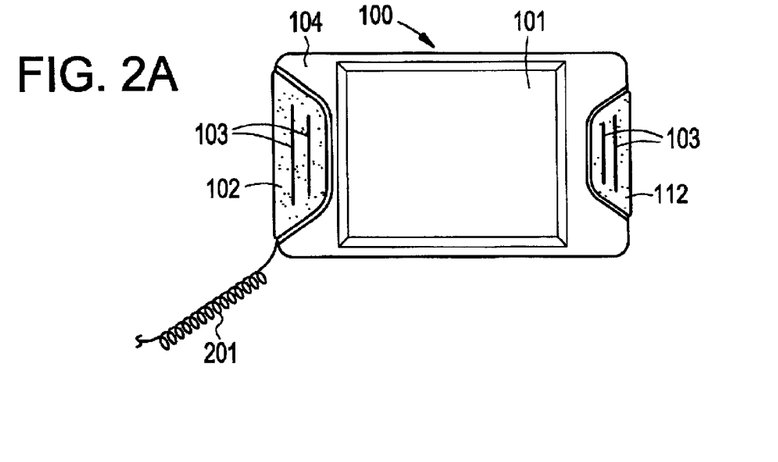
FIG. 2A is a front plan view of the hand held display device of the present invention.
Figure 2B:
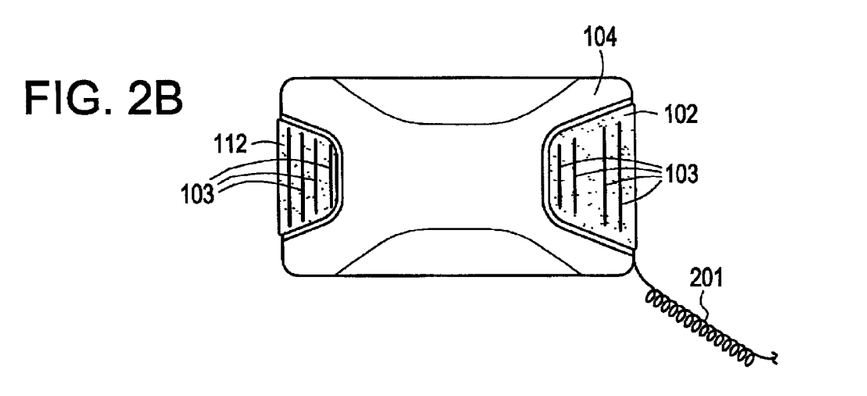
FIG. 2B is a back plan view of the hand held display device of the present invention.
Figure 2C:
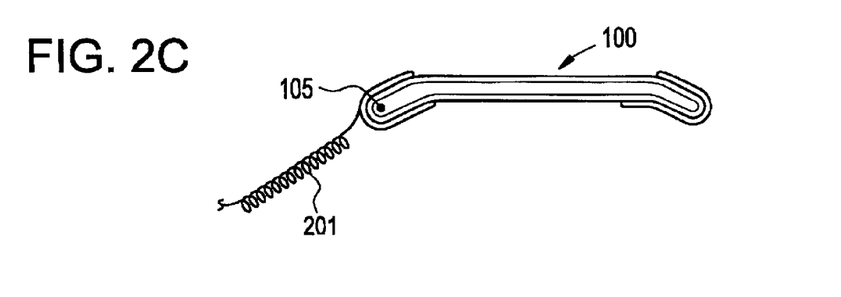
FIG. 2C is a top/bottom side plan view of the hand held display device of the present invention.

FIGS. 2A, 2B, and 2C demonstrate front, back, and side plan views respectively of an embodiment of the display device 100 of the present invention. FIG. 2A shows the components of the display 100, including screen 101, housing 104, hand grips 102 and 112 composed of rubber or some other non-skid, flexible, electrically insulating material, video cable 201, and tactile ridges 103. While the drawings show 2 or 4 ridges 103, any suitable number of ridges may be used. Ideally the ridges 103 are located to approximate the locations of the touch points of a human hand while gripping the hand grips 102, 112. FIG. 2B illustrates the reverse side of the display device 100 of the present invention. FIG. 2C illustrates a side view of the present invention, wherein the power button 105 is visible.

Figure 3:
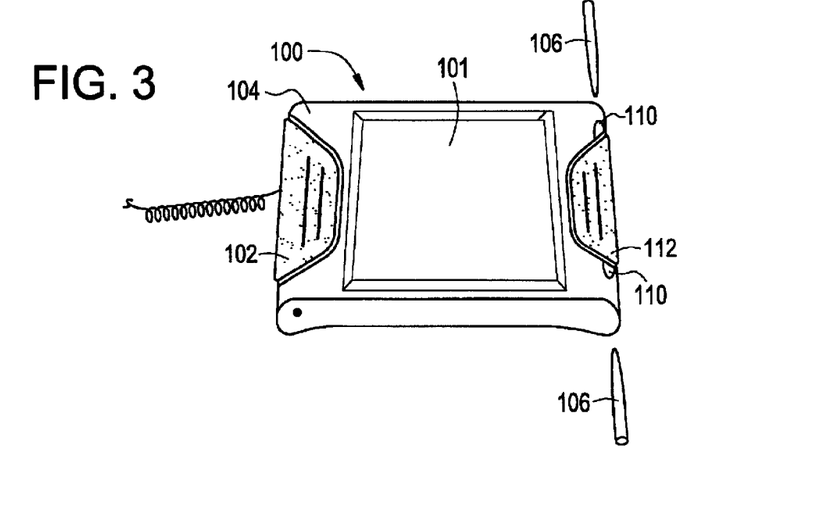
FIG. 3 is a front perspective view highlighting various novel features of the hand held display device of the present invention.

FIG. 3 illustrates a front perspective view of the display device 100 of the present invention. Visible in this perspective view is the housing 104, touch screen 101, disposed on a major front face of said housing 104, stylus 106, and hand grips 102, 112. Stylus 106 may be placed in either receiving opening 110 depending upon whether the user is utilizing the display device 100 in a left handed or right handed mode. Left or right handed use may be affected by either a hardware or software switch. Also possible is the ability to switch between landscape and portrait modes, although due to the position of the handgrips 102 and 112, landscape is the preferred mode for extended use.

Figure 4A:
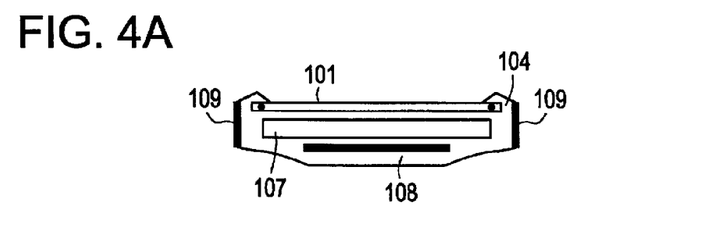
FIG. 4A is an end cross section plan view of hand held display device of the present invention.
Figure 4B:
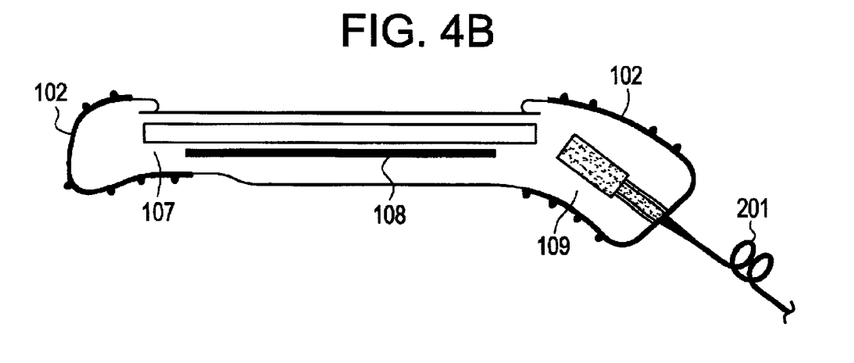
FIG. 4B is a top/bottom cross section plan view of the hand held display device of the present invention.

FIGS. 4A and 4B illustrate side and top internal cross section views of an embodiment of the display device of the present invention. In FIG. 4A can be seen touch screen 101, flat panel display 107, housing 104, rubber sealing gasket 109, and printed circuit board 108. FIG. 4B reveals hand grips 102 and 112, flat panel display 107, printed circuit board 108, power supply circuit 109 and cord 201.

Figure 5:
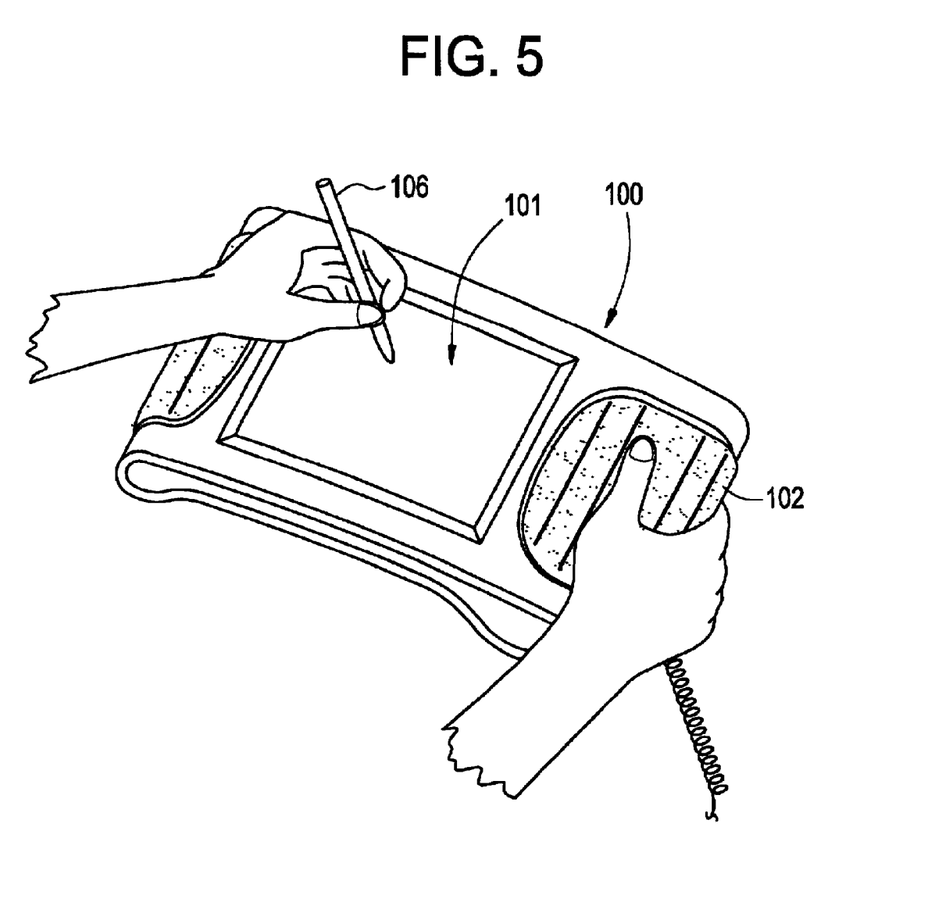
FIG. 5 is a perspective view of a person utilizing the hand held display device of the present invention.

FIG. 5 illustrates a user using one embodiment of the display device 100 of the present invention. With one hand user grips the display device 100 using hand grip 102. With the other, he uses included stylus 106 to activate the touch screen 101 display.

Figure 6A:
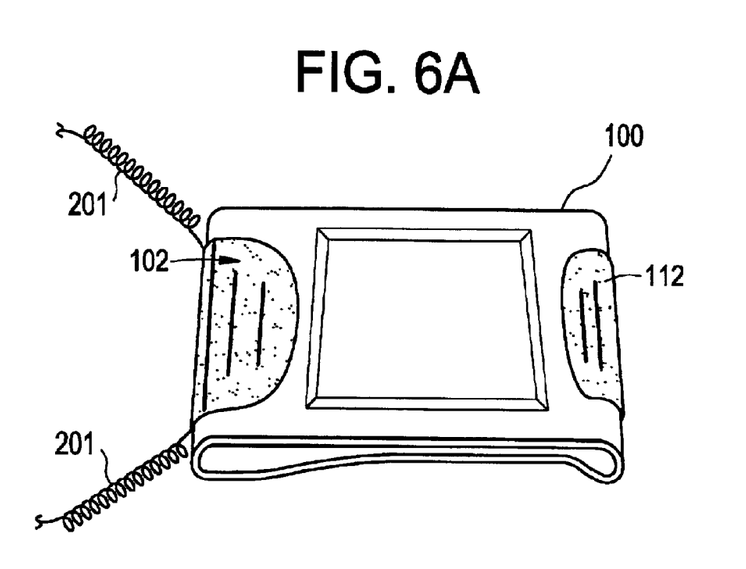
FIG. 6A is a front perspective view of the hand held display device of the present invention.
Figure 6B:
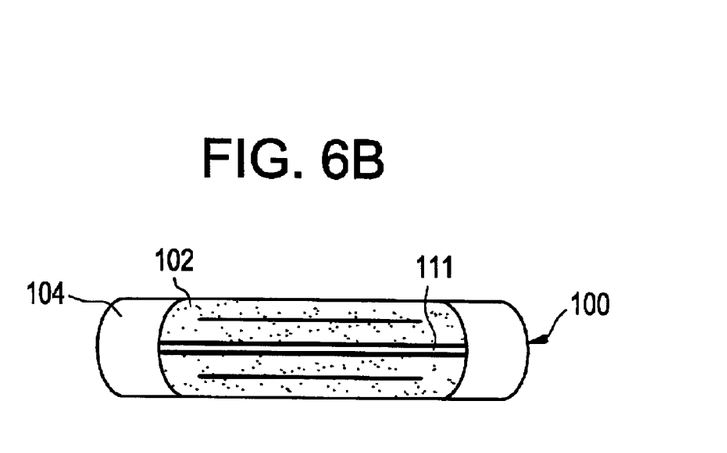
FIG. 6B is a side end view of the hand held display device of the present invention.

FIGS. 6A and 6B illustrate an embodiment of the display device 100 of the present invention, in which the cord 201 which runs through the center of the primary hand grip 102. The grip has a channel 111 in it allowing the cord to always be routed below a person's hand when they are gripping it using the primary hand grip 102. By use of the channel 111 this is possible with right or left handed use. The cord 201 is simply tucked into the channel 111 so that is doesn't interfere with the user's grip and the cord 201 stays closer to the user's body so that it minimizes opportunities to become tangled or get in his way.

Figure 7:
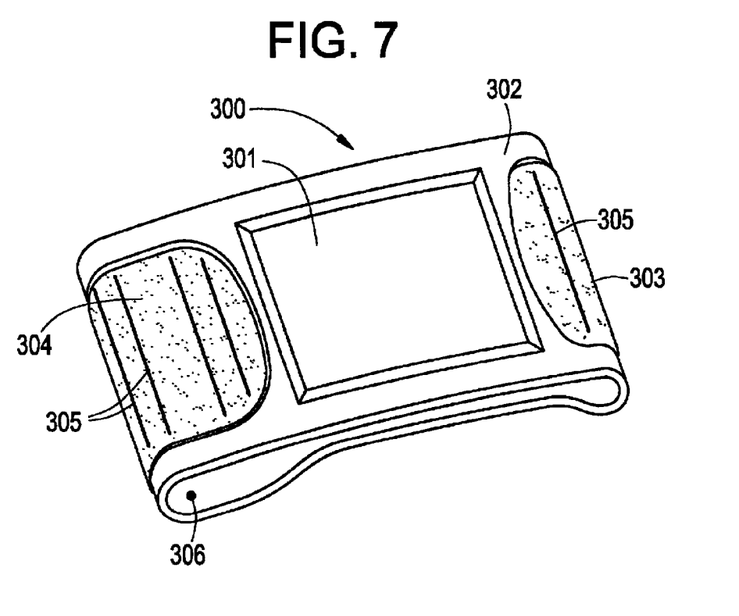
FIG. 7 is a perspective view of an integrated embodiment of the hand held display device of the present invention.

FIG. 7 illustrates an alternative embodiment whereby the display device itself 300 has all the internal components of a computer such that it functions as a full function hand held touch screen computer. FIG. 7 illustrates touch screen 301, housing 302, hand grips 303, 304, with tactile ridges 305, and power button 306.

Figure 8:
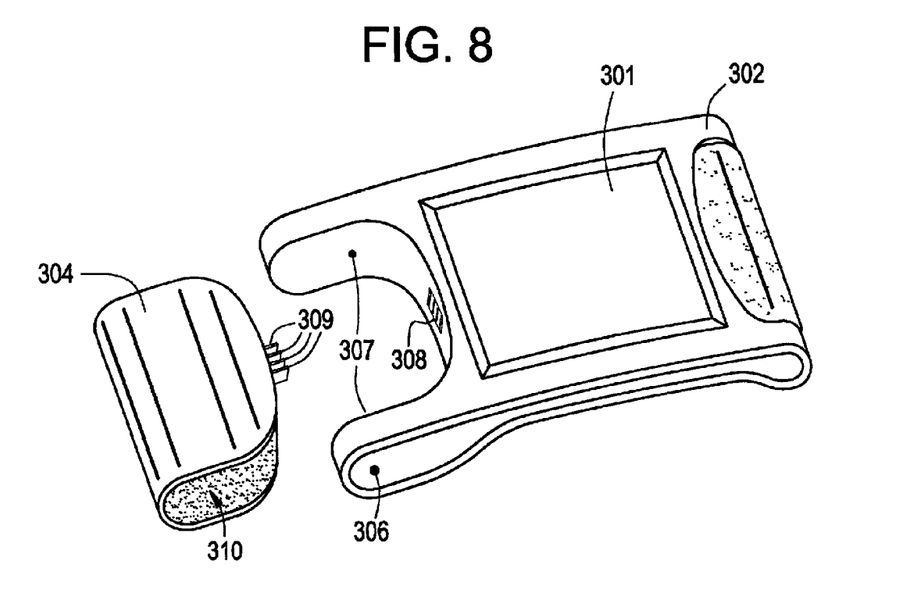
FIG. 8 is a perspective view of the integrated embodiment of the hand held display device of the present invention detailing the removable power supply.

FIG. 8 demonstrates a different perspective view of the display device 300 wherein the battery 310 is detached from the display device 300. The battery is covered on at least one face by primary hand grip 304. The battery 310 has power connectors 309 which mate with connectors 308 on the display device 300. Restraining clips 307 hold the battery 310 in place when it is engaged with the display device 300.

The preferred and optimally preferred embodiments of the present invention have been described herein and shown in the accompanying drawings to illustrate the underlying principles of the invention, but it is to be understood that numerous modification and ramifications may be made without departing from the spirit or scope of this invention.

We claim:

1. An ergonomic hand held flat panel display device, the device comprising:

a housing, a touch responsive flat panel display screen disposed on one major face of said housing, a primary handgrip and a secondary handgrip on said display housing wherein said primary hand grip and said secondary handgrip are disposed on opposing sides of said housing, both of said handgrips wrapping around said housing from the front to the back of said housing, both of said handgrips further angled inward towards the back of the display device, a printed circuit board inside said housing in electrical contact with and enabling said flat panel display to display computer output, a connector for receiving power and output signal from a computer said output signal to be displayed on said flat panel display, wherein mass inside said housing is distributed towards the primary handgrip.

2. The display device of claim 1 comprising at least two tactile ridges disposed on each of said handgrips.

3. The display device of claim 1 wherein said primary handgrip is physically larger in surface area than said secondary handgrip.

4. The display device of claim 1 wherein said primary handgrip and said secondary handgrip are contoured to fit a user's hand and have only rounded edges to maximize comfort against a user's hand.

5. The display device of claim 1 wherein said primary and secondary handgrips are composed of rubber or other suitable shock absorbing friction enhancing material.

6. The display device of claim 1 wherein both of said handgrips are curved inward toward the back of said display device an angle greater than 0 degrees but less than 45 degrees.

7. A hand held, flat panel display device comprising:

a display housing, said display housing containing a touch screen display with an underlying flat panel display disposed on a major front face of said housing, said housing further containing a printed circuit board in electrical contact with and for outputting video signals to said flat panel display and for performing computer operations, including at least a microprocessor, volatile and non-volatile storage, and video graphics hardware to provide signal and control to said flat panel display, a primary handgrip and a secondary handgrip on said display housing wherein said primary hand grip and said secondary handgrip are disposed on opposing ends of said housing, both of said handgrips wrapping around said housing from the front to the back of said housing, both of said handgrips further angled inward towards the back of the display device, and further wherein said primary hand grip surrounds a removable battery, which can be selectively engaged or disengaged from said housing, wherein mass inside said housing is distributed towards the primary handgrip.

8. The hand held display device of claim 7 wherein said primary handgrip is physically larger in surface area than said secondary handgrip.

9. The hand held display device of claim 7 wherein said primary handgrip and said secondary handgrip are contoured to fit a user's hand and have only rounded edges to maximize comfort against a user's hand.

10. The display device of claim 7, wherein said device is operable for right handed or left handed use such that a user may always hold the device using at least the primary hand grip.

11. The display device of claim 7 wherein said primary and secondary handgrips are composed or other suitable shock absorbing friction enhancing material.

12. The display device of claim 7 wherein both of said handgrips are curved inward toward the back of said display device an angle greater than 0 degrees but less than 45 degrees.

13. An ergonomic hand held flat panel display device, the device comprising:

a housing, a touch screen disposed on one major face of said housing, a flat panel display behind said touch screen and responsive to said touch screen, a primary handgrip and a secondary handgrip on said display housing wherein said primary hand grip and said secondary handgrip are disposed on opposing sides of said housing, both of said handgrips wrapping around said housing from the front to the back of said housing, said handgrips further angled inward towards the back of the display device, a printed circuit board inside said housing enabling electrically connected to and said flat panel display and enabling said flat panel display to display computer output and selectively to perform independent computer functions, said circuit board comprising at least a microprocessor, volatile and non-volatile storage, and video graphics hardware for sending output to and controlling said flat panel display, a connector for receiving power and output signal from a computer said output signal to be displayed on said flat panel display, wherein mass inside said housing is distributed towards the primary handgrip.

14. The display device of claim 13, wherein said display device is operable in a first passive mode of operation and a second active mode of operation, wherein during said first mode of operation the display device performs as a display for another computer and in a second mode of operation the display device performs as an independent computer utilizing its own computer hardware for processing power.

15. The display device of claim 13 wherein said primary handgrip is physically larger in surface area than said secondary handgrip.

16. The display device of claim 13 comprising at least two tactile ridges disposed on each of said handgrips.

17. The display device of claim 13 wherein said primary handgrip and said secondary handgrip are contoured to fit a user's hand and have only rounded edges to maximize comfort against a user's hand.

18. The display device of claim 13 wherein said primary handgrip surrounds a battery which powers said display device, wherein said battery may be selectively engaged or disengaged by a user.

19. The display device of claim 13 wherein said primary and secondary handgrips are composed of rubber or other suitable shock absorbing friction enhancing material.

20. The display device of claim 13 wherein both of said handgrips are curved inward toward the back of said display device an angle greater than 0 degrees but less than 45 degrees.

21. The display device of claim 13, wherein said display device is operable in a first mode of operation and a second mode of operation, wherein during said first mode of operation the display device is enabled to display video signals from another computer and in a second mode of operation the display device performs as an independent computer including a personal digital assistant and thin client computer utilizing its own computer hardware for processing power.

22. An ergonomic hand held flat panel display device, the device comprising:

a housing, a touch screen disposed on one major face of said housing, a flat panel display behind said touch screen and responsive to said touch screen, a primary handgrip and a secondary handgrip on said display housing wherein said primary hand grip and said secondary handgrip are disposed on opposing ends of said housing, both of said handgrips wrapping around said housing from the front to the back of said housing, said handgrips further angled inward towards the back of the display device, a printed circuit board inside said housing in electrical contact with and enabling said flat panel display to display computer outputs, wherein mass inside said housing is distributed towards the primary handgrip.

23. The device of claim 22 wherein said handgrips are angled towards the back of the display device at an angle greater than 0 degrees but less than 45 degrees.

24. The device of claim 22 wherein at least two tactile ridges are disposed on each of said handgrips.

25. The device of claim 22 further comprising a wireless receiver inside said housing and in electrical communication with said circuit board for communicating and selectively receiving information from another computer wirelessly.

26. A hand held flat panel computer display unit comprising in combination:

a display housing comprising at a front and back side;

a touch screen disposed on one major face of said housing;

a primary and a secondary handgrip on opposing terminal sides of said housing, both of said handgrips wrapping in a rounded configuration around said terminal sides of said housing, each of said hand grips being electrical insulating and substantially non-skid, a printed circuit board inside said housing adapted to be in contact with said touch screen to enable said flat panel display to display computer output, wherein mass inside said housing is distributed towards the primary handgrip.

27. The flat panel display of claim 26 wherein said handgrips are angled inward toward the back side of said housing at an angle greater than 0 and less than 45 degrees.

28. The flat panel display of claim 26 wherein said primary handgrip is physically larger in surface area than said secondary grip.

29. The flat panel display of claim 26 wherein both of said handgrips are composed of rubber or other suitable shock absorbing friction enhancing material.

30. The flat panel display of claim 26 wherein at least one of said terminal sides has an electrical cable connected thereto.

31. The flat panel display of claim 26 having at one of said terminal sides a removable power supply which is also part of a handgrip.

32. The flat panel display of claim 26 having a connector adapted to be connected to a computer.

33. An ergonomic flat panel computer display device, the device comprising:

a housing, a touch responsive flat panel display screen disposed on one major face of said housing, a pair of hand grips on opposing ends of said housing, said hand grips wrapping around from the display screen face of said housing to the opposing face of said housing and said hand grips further angled inward toward said opposing face, wherein mass inside said housing is distributed towards the primary handgrip.

34. The display device of claim 33 wherein said display device is adapted as an external display for a computer.

35. The display device of claim 33 wherein said display device is adapted to function as an independent computer.

36. The display device of claim 33 internal components in of said device is distributed nearer to one of said hand grips than the other handgrip.

37. The display device of claim 33 wherein said handgrips are angled inward toward the back side of said housing at an angle greater than 0 and less than 45 degrees.

38. The display device of claim 33 wherein said handgrips are composed of a shock absorbing, non-skid, electrically insulating material.

39. The flat panel display of claim 33 having at one side a removable power supply which is also part of a handgrip.

* * * * *